(12) United States Patent
Yang

(10) Patent No.: US 9,075,990 B1
(45) Date of Patent: Jul. 7, 2015

(54) RELIABLE SELECTION OF SECURITY COUNTERMEASURES

(71) Applicant: Shape Security, Inc., Palo Alto, CA (US)

(72) Inventor: Siying Yang, Cupertino, CA (US)

(73) Assignee: Shape Security, Inc., Palo Alto, CA (US)

( * ) Notice: Subject to any disclaimer, the term of this patent is extended or adjusted under 35 U.S.C. 154(b) by 0 days.

(21) Appl. No.: 14/321,172

(22) Filed: Jul. 1, 2014

(51) Int. Cl.
*G06F 21/55* (2013.01)
*H04L 29/06* (2006.01)

(52) U.S. Cl.
CPC .............. *G06F 21/55* (2013.01); *H04L 63/20* (2013.01)

(58) Field of Classification Search
CPC ..... G06F 21/10; G06F 21/121; G06F 21/125; G06F 21/128; G06F 21/14; G06F 21/335; G06F 21/6263; G06F 21/50; G06F 21/55; G06F 21/54; G06F 17/30899; G06F 17/30876; H04L 63/1466; H04L 63/20
USPC .......................................... 726/1, 10, 26–30
See application file for complete search history.

(56) References Cited

U.S. PATENT DOCUMENTS

| | | | |
|---|---|---|---|
| 7,480,385 B2 | 1/2009 | Weber | |
| 7,707,223 B2 | 4/2010 | Zubenko et al. | |
| 7,836,425 B2 | 11/2010 | Rubin et al. | |
| 7,895,653 B2 | 2/2011 | Calo et al. | |
| 8,086,756 B2 | 12/2011 | Kamyshenko et al. | |
| 8,170,020 B2 | 5/2012 | Oliver et al. | |
| 8,200,958 B2 | 6/2012 | Coppola et al. | |
| 8,266,202 B1 | 9/2012 | Colton et al. | |
| 8,347,396 B2 | 1/2013 | Grigsby et al. | |
| 8,561,193 B1 | 10/2013 | Srivastava et al. | |
| 8,621,197 B2 | 12/2013 | Suryanarayana et al. | |
| 8,689,330 B2 | 4/2014 | Sinn et al. | |
| 8,826,424 B2 * | 9/2014 | Lyne et al. ....................... 726/22 |
| 2002/0099827 A1 | 7/2002 | Shah et al. | |
| 2004/0162994 A1 | 8/2004 | Cohen et al. | |
| 2005/0050355 A1 * | 3/2005 | Graunke ....................... 713/201 |

(Continued)

FOREIGN PATENT DOCUMENTS

WO  WO 2013/091709  6/2013

OTHER PUBLICATIONS

H. Krawczyk, "HMAC-based extract-and-expand key derivation function (HKDF)"—RFC 5869, IETF, May 2010, 10 pages.*

(Continued)

*Primary Examiner* — Catherine Thiaw
(74) *Attorney, Agent, or Firm* — Fish & Richardson P.C.

(57) ABSTRACT

Among other things, this document describes a computer-implemented security method such as for authenticated selection of security countermeasures and for reliable identification of computing devices. The method can include receiving, by a computing system, a request from a computing device for an electronic resource. The computing system can identify a security token received from the device that made the request. Based on the security token, particular security countermeasures can be selected that are to be applied to the electronic resource to be served in response to the request. The countermeasures can be operable to interfere with an ability of malware to interact with the served electronic resource when the served electronic resource is on the computing device. Portions of the electronic resource that are to be executed on the computing device can be re-coded using the selected particular security countermeasures.

23 Claims, 7 Drawing Sheets

(56) References Cited

U.S. PATENT DOCUMENTS

| | | | |
|---|---|---|---|
| 2008/0183902 | A1 | 7/2008 | Cooper et al. |
| 2008/0222736 | A1 | 9/2008 | Boodaei et al. |
| 2009/0193513 | A1 | 7/2009 | Agarwal et al. |
| 2009/0249310 | A1 | 10/2009 | Meijer et al. |
| 2009/0282062 | A1 | 11/2009 | Husic |
| 2009/0293018 | A1* | 11/2009 | Wilson et al. ............. 715/811 |
| 2010/0100927 | A1* | 4/2010 | Bhola et al. ............... 726/1 |
| 2010/0115594 | A1* | 5/2010 | Paya et al. ................. 726/5 |
| 2010/0125612 | A1* | 5/2010 | Amradkar et al. ......... 707/802 |
| 2010/0125913 | A1* | 5/2010 | Davenport et al. ......... 726/25 |
| 2010/0257354 | A1 | 10/2010 | Johnston et al. |
| 2010/0262780 | A1 | 10/2010 | Mahan et al. |
| 2011/0178973 | A1 | 7/2011 | Lopez et al. |
| 2011/0283110 | A1* | 11/2011 | Dapkus et al. ............. 713/182 |
| 2011/0296391 | A1 | 12/2011 | Gass et al. |
| 2011/0302623 | A1* | 12/2011 | Ricci ......................... 726/1 |
| 2012/0022942 | A1 | 1/2012 | Holloway et al. |
| 2012/0096116 | A1 | 4/2012 | Mislove et al. |
| 2012/0124372 | A1 | 5/2012 | Dilley |
| 2012/0192283 | A1* | 7/2012 | Gu et al. ................... 726/26 |
| 2012/0204221 | A1* | 8/2012 | Monjas Llorente et al. ... 726/1 |
| 2012/0216251 | A1* | 8/2012 | Kumar et al. .............. 726/3 |
| 2013/0014256 | A1* | 1/2013 | Krizenecky ................ 726/23 |
| 2013/0091582 | A1* | 4/2013 | Chen et al. ................ 726/26 |
| 2013/0198607 | A1 | 8/2013 | Mischook et al. |
| 2013/0219509 | A1* | 8/2013 | You et al. ................... 726/26 |
| 2013/0232234 | A1 | 9/2013 | Kapur et al. |
| 2013/0340043 | A1* | 12/2013 | Zarei et al. ................ 726/4 |
| 2014/0089786 | A1 | 3/2014 | Hashmi |
| 2014/0245373 | A1* | 8/2014 | Martin et al. .............. 726/1 |
| 2014/0283067 | A1* | 9/2014 | Call et al. .................. 726/23 |
| 2014/0283069 | A1* | 9/2014 | Call et al. .................. 726/23 |

OTHER PUBLICATIONS

D. Kristol "HTTP state management mechanism"—RFC 2965, IETF, Oct. 2000, 19 pages.*

D. Hardt, "The OAuth 2.0 Authorization Framework," Internet Engineering Task Force, Oct. 2012, 76 pages.

Hueniverse [online]. "Introduction," published before Jul. 1, 2014, [Retrieved on Jul. 1, 2014]. Retrieved from Internet: <URL: http://hueniverse.com/oauth/guide/intro/>. 4 pages.

Wikipedia [online]. "List of HTTP header fields," Jun. 18, 2014, [Retrieved on Jul. 1, 2014]. Retrieved from Internet: <URL: http://en.wikipedia.org/wiki/List_of_HTTP_header_fields>. 11 pages.

Wikipedia [online]. "MD5," Jun. 30, 2014, [Retrieved on Jul. 1, 2014]. Retrieved from Internet: <URL: http://en.wikipedia.org/wiki/MD5>. 12 pages.

Indiana University [online]. "Authentication vs. Authorization," published before Jul. 1, 2014, [Retrieved on Jul. 1, 2014]. Retrieved from Internet: <URL: https://protect.iu.edu/cybersecurity/authn-authz>. 3 pages.

Boston University Information Services & Technology [online]. "Understanding Authentication, Authorization, and Encryption," published before Jul. 1, 2014, [Retrieved on Jul. 1, 2014]. Retrieved from Internet: <URL: http://www.bu.edu/tech/services/security/resources/bestpractice/auth>. 4 pages.

SearchSecurity [online]. "security token (authentication token)," Sep. 2005, [Retrieved on Jul. 1, 2014]. Retrieved from Internet: <URL: http://searchsecurity.techtarget.com/definition/security-token>. 3 pages.

Shackleford, D. "Application Whitelisting: Enhancing Host Security," SANS Institute Reading Room, Oct. 2009, 16 pages.

Currie, M., "In-the-wire authentication: Protecting client-side critical data fields in secure network transactions", 2009 $2^{nd}$ International Conference on Adaptive Science & Technology, 6 pages.

* cited by examiner

RELIABLE SELECTION OF SECURITY COUNTERMEASURES

TECHNICAL FIELD

This document generally relates to computer and web security.

BACKGROUND

With the ever increasing demand for online content, web server systems are being adapted to handle requests for content from a growing number of client devices. The greater demand for content not only imposes a burden on the computing resources required to efficiently respond to the requests, but also exposes web servers and client devices that communicate with the web servers, to a variety of security risks. In some cases, for example, malware may surreptitiously infect client devices and be programmed to exploit web pages or other served content on the client devices. Once a web page has been compromised, malware may use the web page as a portal for further illicit actions involving a web server, such as to complete unauthorized transactions on a banking or e-commerce website.

Web servers commonly encounter communications from both benign and malicious client devices. At least a first portion of traffic for web server systems may originate from client devices that are either compromised by malware or that are at a significant risk of being compromised. On the other hand, some traffic originates from trusted client devices that have a very low risk of security threats. For example, website administrators may frequently access their site to test various site features using trusted equipment over a private network where the risk of a security vulnerability being exploited is minimal. As another example, websites are commonly crawled by web bots for indexing purposes on behalf of trusted, well-known search engines. Web server requests generally include one or more pieces of network or header information such as an IP address associated with the client device that is making the request, an indication of the protocol for the request, source and destination port numbers, and application layer header values.

SUMMARY

This document generally describes techniques for selecting countermeasures to apply to resources (content) served to computing devices, such as HTML, CSS, and JavaScript code. The countermeasures may be configured to disrupt or detect exploitation of served resources by malicious software on the computing devices. In general, the countermeasures to be deployed can be based on a level of trust that a security system has with a requestor of the resources. That level of trust may be established by identifying who the requester is, and/or what group the requester belongs in, and selecting appropriate countermeasures, such as by applying fewer countermeasures for a relatively trusted requester.

For example, a security system is described that can coordinate with a web server system to apply security countermeasures to resources served from the web server system before they are delivered to client devices that requested the resources. As one example, a web page hosted by the web server system may be requested by a client device. Before the web page is transmitted to the client in response to the request, the security system can apply one or more security countermeasures to the web page. Some of the countermeasures may include re-coding the web page so as to make it more difficult for bots such as man-in-the-browser software or other malware to interact with the web page. To further disrupt malicious exploitation of a served resource, the countermeasures may be polymorphic such that they are applied differently to content served to each of a plurality of client devices and also applied differently each time that the content is served to particular devices. Polymorphic countermeasures may reduce the predictability of code for a resource each time the resource is served, which increases the difficulty for malware to learn about various features of the resource based on prior analyses of the resource code. A particular set of countermeasures may apply by default in the absence of an indication that the default countermeasures should not apply.

As noted above, sometimes the default countermeasures may not be appropriate or needed when responding to requests from some client devices. For example, a web operator may wish to allow certain bots that are known to serve a legitimate or benign purpose to access resources from the web server without some or all of the default countermeasures being applied to resources served to those bots. Such an approach may be beneficial for the visitors, as they can operate automatically in their benign manner without having to worry about countermeasures blocking their work. Also, the security system can avoid the processing overhead required to add unnecessary, and potentially destructive, countermeasures.

Crawler bots from trusted search engines, load testing bots, and automated web functionality testers are examples of bots that are benign but that may frequently make requests for content from a web server system and that may lead the security system to mistakenly classify as malware. Other clients that have sufficient safeguards in place to minimize malware risks or clients that are personally trusted by operators of the web server system or security system, for example, may also be included in a whitelist that indicates that the security system should apply none or less than all of the default countermeasures to resources requested by the whitelisted devices. By permitting trusted clients to bypass particular countermeasures, conflicts can be prevented from occurring as a result of countermeasures that interfere with the ability of some clients to perform legitimate tasks such as web crawling, the load on the security system can be reduced, and any response latency resulting from the application of countermeasures to served content can be eliminated or reduced.

More generally, techniques are described herein for selecting particular security countermeasures to apply to served resources based on an identifier associated with computing devices that requested the resources. Computing devices that make requests for resources can submit a security token with the requests in order to authenticate their identity with a security system. If the security system determines that a security token is valid, then certain countermeasures can be selected particularly for the computing device that made the request. If the computing device is a whitelisted client, for example, then no security countermeasures may be selected to apply when serving a resource. In some cases, different sets of countermeasures, different levels of countermeasures, or additional countermeasures may be applied depending on the authenticated identity of the computing device that requested a resource. In some implementations, authentication with the security system is reliably performed by using a security token that has been generated at least in part using keys (e.g., shared secret recipes) that are shared between only the security system and trusted clients.

A computer-implemented method is provided in some implementations. The method can include receiving, by a computing system, a request from a computing device for an electronic resource. The computing system can identify a security token received from the computing device that made the request. Based on the security token, particular security countermeasures can be selected that are to be applied to the electronic resource to be served in response to the request. The countermeasures can be operable to interfere with an ability of malware to interact with the served electronic resource when the served electronic resource is on the computing device. Portions of the electronic resource that are to be executed on the computing device can be re-coded using the selected particular security countermeasures, and a re-coded electronic resource can be served to the computing device in satisfaction of the request that includes the re-coded portions and other portions.

These and other implementations can include one or more of the following features. Selecting the particular security countermeasures can include selecting no security countermeasures to be applied to the electronic resource to be served in response to the request.

The selected particular countermeasures can be configured to obfuscate the portions of code for the electronic resource in a manner that does not substantially affect a presentation of the electronic resource when the re-coded electronic resource is executed on the computing device.

The selected particular countermeasures can be configured to insert, into the code for the electronic resource, instrumentation code that is programmed to execute on the computing device and to monitor interaction by other resources on the computing device with the re-coded electronic resource.

Selecting particular security countermeasures that are to be applied to the electronic resource can include selecting, based on a security policy for the computing device, a combination of two or more different countermeasures to add to the electronic resource from among a plurality of different available countermeasures.

Different security policies for different computing devices can specify different combinations of countermeasures to add to electronic resources that are to be served in response to respective requests from the different computing devices.

The method can further include determining whether the security token is valid, and in response to a determination that the security token is invalid, selecting one or more default countermeasures to be applied to the electronic resource to be served in response to the request. Re-coding portions of the electronic resource can include using the one or more default countermeasures to re-code the electronic resource.

The computing system can be configured, in response to receiving a second request for an electronic resource that does not include a security token, to select one or more default countermeasures to be applied to the electronic resource to be served in response to the second request, and to use the one or more default countermeasures to re-code the electronic resource requested in the second request.

The method can further include determining, based on the security token, that the computing device is whitelisted, such that the requested electronic resource is permitted to bypass one or more countermeasures that would otherwise be applied to the electronic resource if the computing device was not whitelisted.

Determining that the computing device is whitelisted can include determining that the requested electronic resource is permitted to bypass all countermeasures that would otherwise be applied to the electronic resource if the computing device was not whitelisted, such that re-coding portions of the electronic resource comprises using no countermeasures to re-code the electronic resource.

The security token can be generated by the computing device based on a shared secret recipe known by the computing device and the computing system.

The security token can be further generated by the computing device using information, specified in the shared secret recipe, from one or more internet protocol (IP), transmission control protocol (TCP), and hypertext transfer protocol (HTTP) header values that are associated with the request from the computing device and that are identifiable by the computing system from the request.

The method can further include decoding, by the computing system, the security token using the shared secret recipe and the one or more IP, TCP, and HTTP header values that are identified from the request from the computing device.

The security token can be provided as a value of a particular HTTP header included in the request from the computing device.

The method can further include determining whether the security token is valid by checking a timestamp included in the security token against at least one of a pre-defined start time and a pre-defined expiration time.

The method can further include changing the shared secret recipe from time to time so that the security token is caused to be generated by the computing device based on updated shared secret recipes at particular times.

In some implementations, a computer system is provided for determining a manner in which to re-code an electronic resource. The system can include a request manager, a security token manager, a security policy manager, a re-coding engine, and a network interface. The request manager is operable to receive requests for electronic resources from computing devices and to obtain the electronic resources responsive to the requests. The security token manager is operable to identify security tokens in the requests from the computing devices. The security policy manager is operable to select, based on the security tokens identified in the requests, particular security countermeasures that are to be applied to the electronic resources that are to be served in response to the requests. The particular security countermeasures may be operable to interfere with an ability of malware to interact with the served electronic resources when the served electronic resources are on the computing devices. The re-coding engine is operable to re-code the electronic resources requested by the computing devices using the particular security countermeasures selected by the security policy manager. The network interface is operable to serve the re-coded electronic resources to the computing devices.

These and other implementations can include one or more of the following features. The system can further include a token recipe manager to generate shared secret recipes for the computing devices that are usable by the computing devices to generate the security tokens based on one or more internet protocol (IP), transmission control protocol (TCP), and hypertext transfer protocol (HTTP) header values associated with the requests from the computing devices.

The security policy manager is further programmed to use the shared secret recipes and the one or more IP, TCP, and HTTP header values to determine whether the security tokens are valid.

Some implementations include one or more computer-readable devices having instructions stored thereon that, when executed by one or more processors, cause performance of operations comprising: receiving a request from a computing device for an electronic resource; identifying a security token received from the computing device that made the request; selecting, based on the security token, particular security countermeasures that are to be applied to the electronic resource to be served in response to the request, the countermeasures operating to interfere with an ability of malware to interact with the served electronic resource when the served electronic resource is on the computing device; re-coding portions of the electronic resource that are to be executed on the computing device using the selected particular security countermeasures; and serving a re-coded electronic resource having the re-coded portions and other portions to the computing device in satisfaction of the request.

These and other implementations can include one or more of the following features. Selecting the particular security countermeasures can include selecting no security countermeasures to be applied to the electronic resource to be served in response to the request.

The selected particular countermeasures can be configured to obfuscate the portions of code for the electronic resource in a manner that does not substantially affect a presentation of the electronic resource when the re-coded electronic resource is executed on the computing device.

The operations can further include, in response to receiving a second request for an electronic resource that does not include a security token, selecting one or more default countermeasures to be applied to the electronic resource to be served in response to the second request, and using the one or more default countermeasures to re-code the electronic resource requested in the second request.

The security token can be generated by the computing device based on a shared secret recipe available to the computing device and the one or more processors.

The security token can be further generated by the computing device using information, specified in the shared secret recipe, from one or more internet protocol (IP), transmission control protocol (TCP), and hypertext transfer protocol (HTTP) header values that are associated with the request from the computing device.

BRIEF DESCRIPTION OF THE DRAWINGS

Like reference numbers and designations in the various drawings indicate like elements.

DETAILED DESCRIPTION

Figure 1:
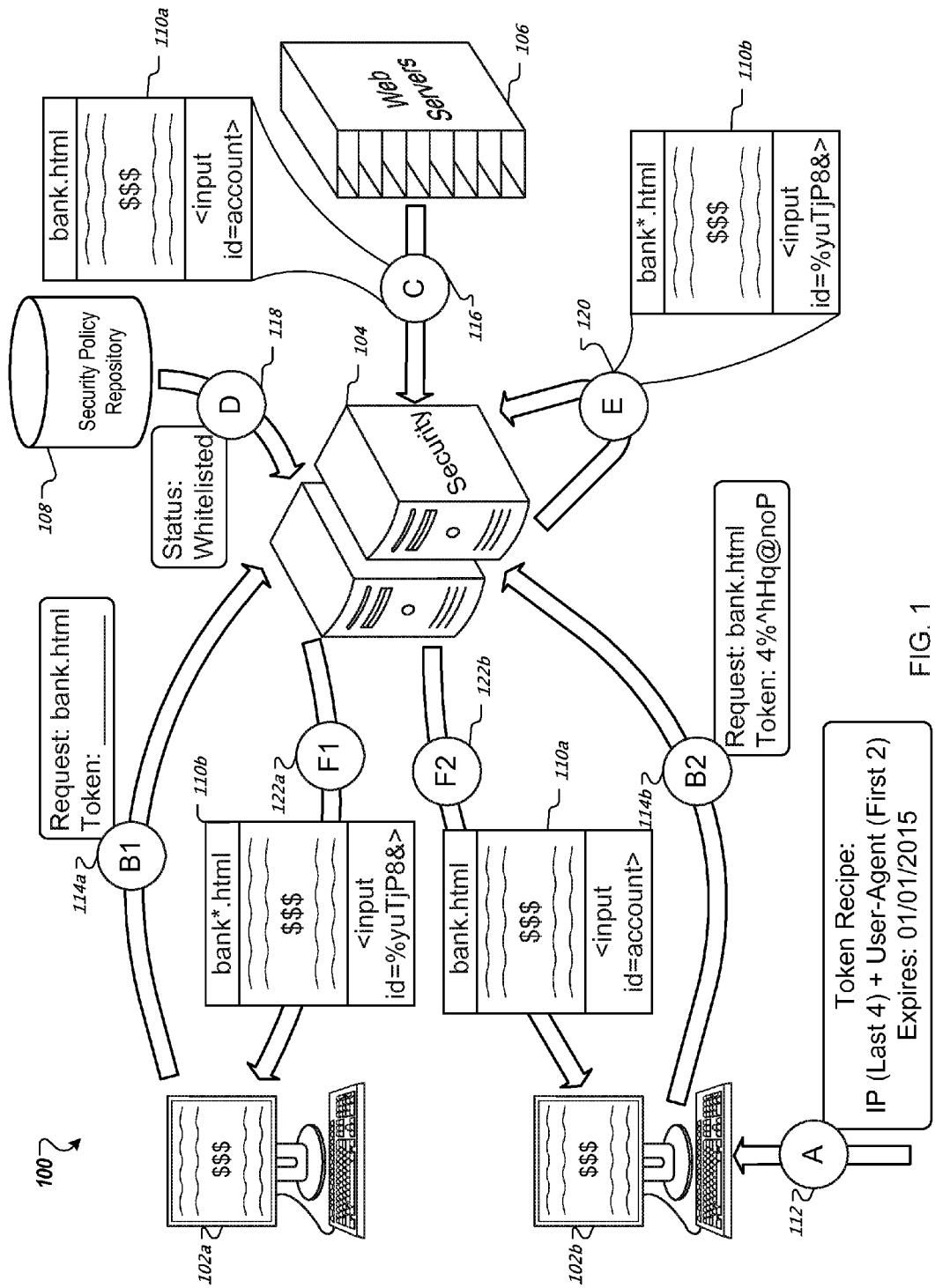
FIG. 1 is a conceptual flow diagram of an example process for selecting particular security countermeasures to apply to a common web page requested by two different client computing devices.

This document generally describes techniques that permit computing devices to authenticate with security systems so that particular security countermeasures can be selected by the security systems to apply to resources served to the computing devices. In some implementations, authenticated selection of countermeasures can allow certain trusted devices to bypass all or some countermeasures that would otherwise be applied to resources served to the devices. For example, some trusted computing devices that are not particularly vulnerable to malicious attacks may be included in a whitelist that indicates that no security countermeasures need to be applied to resources served to those devices. Other computing devices, on the other hand, that are especially vulnerable to malicious attacks may authenticate with a security system so that the security system can apply additional or greater levels of countermeasures to resources served to those devices. As such, different countermeasures can be selected for resources served to different computing devices based on an identity of who has requested a resource and whether the requestor is authenticated with the computing system.

Generally, security countermeasures are operable to interfere with the ability of malware to interact with a served electronic resource on a computing device or to monitor interactions with an electronic resource on a computing device. Applying some countermeasures may include re-coding original code for an electronic resource. However, such re-coding and the application of other countermeasures can be computationally expensive, particularly for a security system that handles large amounts of traffic between clients and web servers. Moreover, some countermeasures may undesirably interfere with legitimate clients such as crawler bots for search engines and web load testing tools. Introducing countermeasures into a resource can also increase the latency associated with responding to a resource request. Therefore, the authentication techniques described in this paper can advantageously allow certain trusted clients to obtain resources without all of the default countermeasures being applied, thereby reducing latency, computational expense, and preventing interference with legitimate operations such as web crawling by trusted clients. For example, a computing device may request a web page from a site hosted by one or more web servers. The web servers for the site may include or be connected to a security system that applies countermeasures to resources served from the site. When the requested web page is retrieved, the web server can first provide the page to the security system before it is served to the client device. Using a security token provided with the request from the computing device, the security system may authenticate the computing device and identify whether there are any countermeasures to apply to the web page, and if so, which ones to apply. By default, the security system may be configured, for example, to re-code the HTML, JavaScript, and CSS code for the web page using countermeasures X, Y, and Z. However, the security token and other information from the request may indicate that the computing device that requested the electronic resource is trusted, and therefore, none, or perhaps only one or two of the default countermeasures should apply to the web page.

In some implementations, as described further below, reliable authentication can be achieved by way of a security token that is configured in a particular manner. A shared secret recipe that is shared only among the security system and trusted computing devices can indicate how combinations of data from the content or headers of a request can be pieced together to generate at least a portion of a security token. Other information, such as randomly selected public data or a shared private string of characters may also be incorporated into the security token. The security token can be encrypted and submitted with a request in order to authenticate a computing device with a security system. If the security token is determined to be valid, for example, by verifying that a valid recipe was used to generate at least a portion of the security token, then the computing device may be authenticated and particular countermeasures selected to apply to the resource in response to the request.

Turning now to FIG. 1, a conceptual flow diagram is shown of an example system and process 100 for selecting particular security countermeasures to apply to a common web page that is requested by two different client computing devices. The flow diagram generally depicts a first client device 102a that does not authenticate with a security system 104 and a second client device 102b that does authenticate with a security system 104. Although each of the first and second client devices 102a, 102b each requests the bank.html web page from web servers 106, default countermeasures are applied only to the web page served to the first client device 102a, but are not applied to the web page served to the second client device 102b, as a result of the second device 102b properly authenticating with the security system 104. In other examples, countermeasures may be applied to resources served to both devices, though the countermeasures for one device may be a mere subset of those for the other device, or the countermeasures may be different as between the devices, without complete Venn-like overlap (one device may be the subject of countermeasures that the other is not, and vice-versa).

Thus, although FIG. 1 shows an example of a whitelisted client device 102b being authenticated in order to bypass default security countermeasures, in some implementations, authentication can be used to select any particular combination of none, one, or more countermeasures that are available to a security system 104 and that are not incompatible with each other. Additionally, similar techniques may apply to resources other than just web pages, such as electronic documents (e.g., PDF, MS WORD documents) and certain other data streams.

At stage A (112), the second client device 102b obtains a shared secret token recipe. A token recipe is information usable by both a client device such as the second client device 102b and a security system such as the security system 104 that indicates how to generate a valid security token for use in authenticating the second client device 102b with the security system 104, and that is not available for malware to fake. To maintain such privacy, the token recipe may have been communicated between the server system 104 and client device 102b at a different time than the run-time communications, via encrypted communication, or in other appropriate manner.

The token recipe may be provided directly from the security system 104 or may be provided indirectly from an entity associated with the security system 104. For example, the second client device 102b may register with the security system 104 and be provided with the token recipe through a secure channel. In some cases, operators of the security system 104 or the web servers 106 may send token recipes to trusted clients who have agreed to access content from the web servers 106 under only certain conditions, for certain purposes (e.g., search crawling and indexing), or with certain safeguards guaranteed. As described further below with respect to FIGS. 4 and 5, a token recipe may specify combinations of one or more network or header values associated with a request for an electronic resource to be used in generating a security token. The example token recipe shown in FIG. 1 indicates that a security token may be formed using the last four digits of the second device's 102b IP address plus the first two characters of the HTTP User-Agent header value.

The token may also be valid for only a limited time before a new token must be obtained for renewed privileges. For example, the token shown in FIG. 1 expires on Jan. 1, 2015, and may not be accepted by the security system 104 after that time. Such expiration helps to ensure that malicious use of a compromised token will at least be limited in time.

At stages B1 (114a) and B2 (114b), the client devices 102a, 102b make respective requests for a webpage, bank.html, from the web servers 106. The first client device 102a includes no security token with the request because it has not been trusted by the security system 104 and has not been provided with a shared secret token recipe required to generate a valid security token. The request 114b from the second client device 102, however, does include a security token. The security token may be sent as part of the request, for example, in a header of an HTTP request for the webpage. The security token indicates to the security system and/or the web servers 106 that the request 114b from the second client device 102b should be trusted and that particular countermeasures, if any, should be selected for responding to the request 114b that may be different than a set of default countermeasures. In some implementations, even if the requests 114a, 114b are addressed to a site hosted by the web servers 106, the requests 114a, 114b may be directed to and received by the security system 104 for initial processing before being forwarded to the web servers 106. For example, the security system 104 may determine whether or not to respond to particular requests, and may also be adapted to respond to requests for recently served or frequently served content that has been cached on the security system 104 without needing to retrieve the same content from web servers 106.

If the bank.html page 110 is not already cached on security system 104, or an updated version of the page is needed, then at stage C (116), the security system 104 can request the web page 110a from the web servers 106, and the web servers 106 can provide web code and related components of the page 110a (e.g., HTML, JavaScript, CSS, images, video, web applications, etc.) to the security system 104. The security system 104 may identify that the first client device 102a has not provided a security token or other indication that it may be a trusted device. Therefore, the security system 104 may apply one or more default countermeasures to the page 110b that is served to the first client device 102a. By way of example, the security system 104 may modify elements of the bank.html web code so as to interfere with the ability of malware that may have compromised the first client device 102a to interact with the web page.

One re-coding transformation is shown in FIG. 1, as the original bank.html page 110a served from the web servers 106 has an <input> field whose 'id' is 'account.' After re-coding the page 110a using one or more security countermeasures, the re-coded page 110b that is transmitted to the first client device 102a with an obfuscated 'id' value, '%yuTjP8&'. If malware is programmed to look for an input field with the 'id' value 'account,' it will not be found in the re-coded page 110b. Additional and more sophisticated countermeasures are described below with respect to FIGS. 3 and 6, for example. At stage F1 (122a), the re-coded bank*.html page 110b is transmitted to the first client device 102a.

At stage D (118), the process 100 authenticates the second client device 102b. Moreover, the second client device 102b is determined to be on a whitelist of devices that are permitted to have content from the web servers 106 served without being re-coded for any security countermeasures. The security system 104 can authenticate the second client device based on the security token that was received with the request. For example, the security system 104 may extract a client cookie form the security token that was generated using the shared secret cookie recipe. The security system 104, which may also possess the shared secret cookie recipe, may generate another copy of the client cookie using the shared secret cookie recipe and the IP address and HTTP User-Agent information identified from the request 114b.

If the client cookie generated by the security system 104 matches the client cookie generated by the second client device 102b, then the request 114b from the second client device 102b may be authenticated. Moreover, a security policy may be identified from security policy repository 108 for the second client device 102b that indicates whether and how any countermeasures should be applied to resources served in response to requests from the second client device 102b. In this example, the security system 104 determines that there are no countermeasures to be applied to the bank.html page before it is transmitted to client device 102b. Therefore, the original web code without any re-coding due to countermeasures is transmitted to the second client device 102b at stage F2 (122b).

Thus, by these techniques, code is served to all clients having the same functional operation—i.e., its operation seems the same to all recipients. (Note, however, that access to the code at all can separately be limited by a requester providing adequate authentication.) However, the underlying code may be different as between servings, and may be supplemented based on the type and level of countermeasures deemed appropriate for a particular requesting device (which may be associated by the system with a particular user and a user account). In short, each of the devices gets equivalent resources, but the form that those resources take can depend on decisions made by the system regarding the identity of the requesting device and the level of trust to be given such device.

Figure 2:
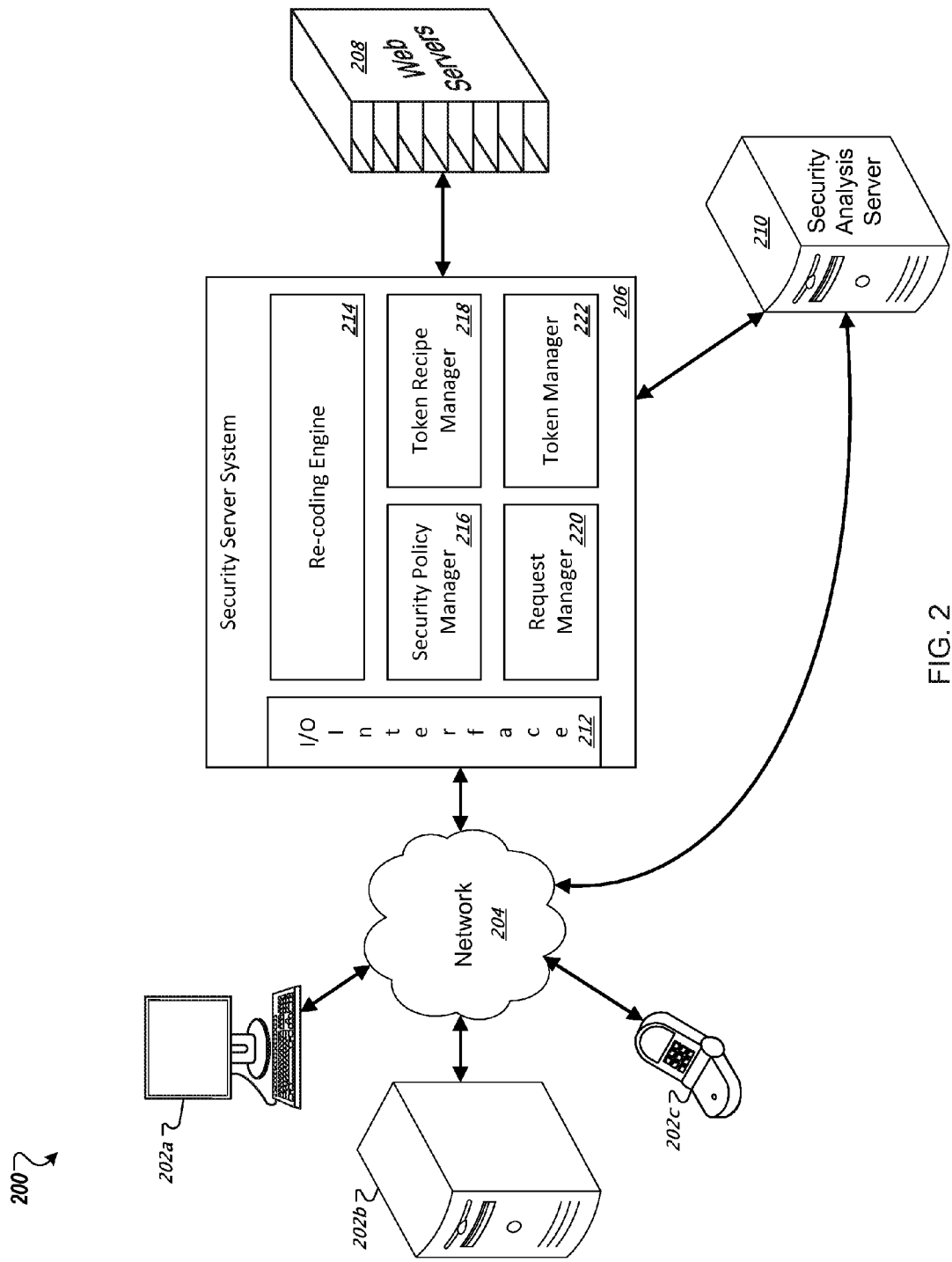
FIG. 2 is a schematic diagram of an example system that re-codes electronic resources based on particular security countermeasures selected for particular clients.

FIG. 2 is a schematic diagram of an example system 200 for re-coding electronic resources based on particular security countermeasures selected for a computing device to which the resources are served. The system 200 may include one or more client computing devices 202a-c that make requests for electronic resources, a network 204 such as the Internet (and ancillary networks, such as LANs at client and server sites) over which communications are made to and from the client devices 202a-c, a security system 206, one or more web servers 208, and a security analysis server 210. Particular components of the system 200 may be adapted in some implementations to perform the processes described with respect to FIGS. 1, 3, 4, and 5, and may be adapted to perform like operations similar to those performed by the system 600 in FIG. 6. For example, the security system 206 may perform operations like those performed by security servers 602a-n, and security system 104.

The system 200 is operable to exchange communications between the client devices 202a-c, the security system 206, web servers 208, and security analysis server 210. The system 200 can serve electronic resources to the client devices 202a-c that have been re-coded according to one or more security countermeasures in order to interfere with the ability of malware on the client devices 202a-c to exploit served resources. The client devices 202a-c may authenticate with the security system 206, in which case, the security system 206 can identify none, one, or more particular countermeasures to apply to a request. The selected countermeasures for an authenticated request may be different than those applied for a non-authenticated request, which may apply by default. Information from client devices 202a-c, such as reports from instruction code that monitors interaction with served resources may be provided to and aggregated at the security analysis server 210. The aggregated information can be analyzed by the security analysis server 210 do determine particular signals that indicate whether an interaction with a resource is likely malicious (e.g., by malware) or benign (e.g., by legitimate user interaction), for example. The web servers 208 may host content for one or more websites. Resources requested from the web servers 208 may be first provided to the security system 206 for any applicable security countermeasures to be applied before delivering the resources to the client devices 202a-c. Although three client devices 202a-c are depicted as examples in FIG. 2, more or fewer devices may communicate in the system 200. For example, hundreds of thousands or even millions of client devices may visit a popular website hosted by the web servers 108.

The security system 206 can include an I/O interface 212 (network interface), a re-coding engine 214, a security policy manger 216, a token recipe manger 218, a request manager 220, and a token manager 222. The I/O interface 212 is operable to receive and transmit data from the security system 206. For example, the security system 206 may be arranged as a reverse proxy server for the web servers 208 so that requests form the client devices 202a-c for content from the web servers 208 are first processed by the security system 206. The request manager 220 can receive requests for electronic resources from the client devices 202a-c and communicate with the web servers 108, and other servers as needed, to obtain the electronic resources responsive to the requests. The re-coding engine is configured to re-code electronic resources requested by computing devices using particular security countermeasures selected by the security policy manager 216. The security token manager 222 can identify security tokens associated with or included in requests from the client devices 202a-c. The token manager 222 may determine whether a security token is included or otherwise associated with the request, and may evaluate the validity of the security token to determine whether the request for a resource is authenticated.

The token recipe manager 218 is operable to generate shared secret recipes for the client devices 202a-c that are in turn usable by the devices 202a-c to generate at least a portion of the security token, such as a client cookie, based one or more pieces of information. The information specified by the shared secret recipes, from which client cookies are created, can include network and application header information associated with a request, or other information known or accessible to the security system 206. The token recipe manager 218 can provide security tokens to client devices 202a-c upon request from a user with appropriate privileges. In some cases, the token recipe manager 218 can transmit updated shared secret cookie recipes to the client devices 202a-c periodically or at other determined times. The token recipe manager 218 may store cookie recipe information correlated with identifiers for particular clients or computing devices. As such, a Client ID in the security token from a particular request, for example, can be used to look-up the correct cookie recipe for the client that made the particular request.

The security policy manager 216 selects particular security countermeasures for the security system 206 to apply to served resources based on security tokens that have been received with client requests for the served resources. In some implementations, the security policy manager 216 may select particular countermeasures to apply based on a determination that a requesting device is authenticated and the security token is valid. For example, if the same security policy were applicable to any computing device that presented a valid security token with a request, then the countermeasures specified by the common security policy may be selected based simply on the determination that the security token is valid without accessing a security policy uniquely assigned to the requesting device. In some implementations, security policies may be uniquely assigned among different client devices 202a-c. In that case, the security policy corresponding to a particular device that requested an electronic resource may be identified and evaluated to determine whether and which countermeasures are to apply to electronic resources served to the particular device.

Figure 3:
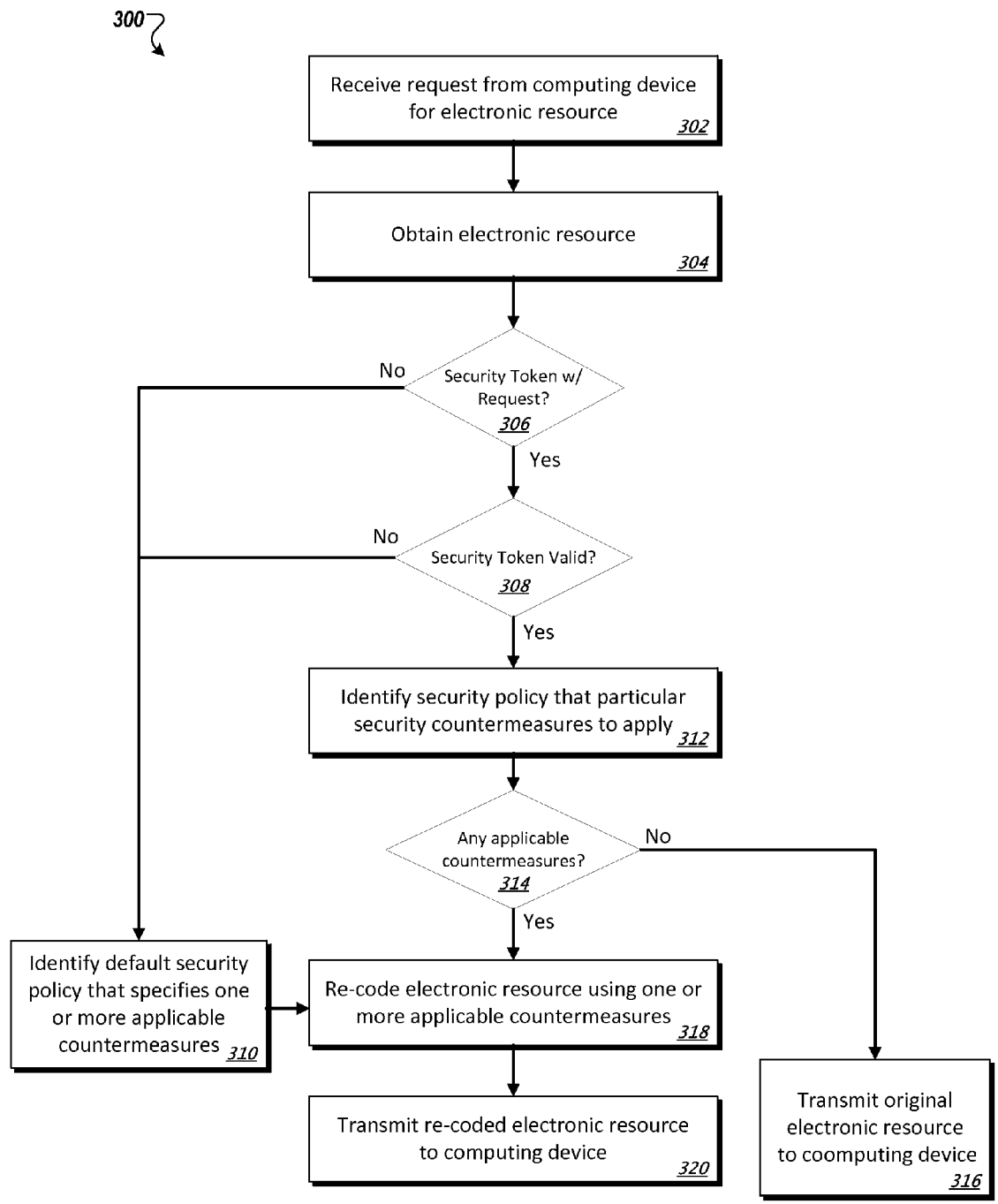
FIG. 3 depicts a flowchart of an example process for using a security token to authenticate a client device and to determine a manner in which to apply security countermeasures to an electronic resource.

With reference to FIG. 3, a flowchart is shown of an example process 300 for using a security token to authenticate a client device and to determine a manner in which to apply security countermeasures to an electronic resource. In some implementations, the process 300 may be carried out by the systems discussed throughout this paper, such as those described with respect to FIGS. 1, 2, and 6.

The process 300 begins at box 302 where a request is received from a client device for an electronic resource. The request may be received by a security system that is programmed to intercept resources that have been requested by client devices before they are ultimately delivered to the client devices, and to re-code all or portions of the code for the electronic resources that is to be executed at the client devices. Unlike some cryptographic systems that encrypt data primarily for the purpose of securely transmitting and storing data in a manner that does not change the underlying data executed by a device when the data is de-crypted, the security system is programmed to re-code the underlying data for an electronic resource that is to be executed at a client device. For example, a client device may make a request from a web browser for a web page that is to be loaded and executed by the web browser.

The security system may be programmed in some implementations to encrypt the web page to protect against, for example, eavesdroppers on an unsecure communications channel. But more than just encrypting the web page, the security system may also be adapted to re-code all or some of the HTML, JavaScript, CSS, or other web code that makes up the web page and that will be executed by the browser, for example, on the client computing device to generate a presentation of the web page. In some implementations, the security system may be a software module on a computer server system, may be a virtual server or machine, or may be one or more physical machines that are logically situated between the client devices and one or more web servers that host content requested by the client devices.

The requested electronic resource may be any of one or more types of appropriate data. In some implementations, the electronic resource may include a web page, a document, a file, streaming data, and the like. A particular electronic resource may be comprised of one or more sub-resources (components). For example, a web page may be defined by an HTML page that references other sub-resources that all coordinate to generate a complete presentation of the web page. Style sheets, such as CSS, are sub-resources that apply defined styles to a web page. JavaScript code, for example, is a sub-resource that adds interactive capabilities to a web page. The web page may also include media content such as images, videos, and advertisements that are also sub-resources of the web page. Generally, the resource may be deemed to include all or some of the sub-resources in some implementations. When a web page is re-coded, for example, the HTML page, CSS, and JavaScript code for the web page may all be re-coded in a coordinate fashion so as to not break the functionality or appearance of the web page.

The process 300 may apply to various types of client devices. Client devices, as used throughout this paper, may generally encompass computing devices and systems that make requests for electronic resources, from server systems, which are subject to one or more re-coding measures. Client devices may include end user devices such as home or work desktop computers, or mobile devices such as tablets and smartphones. Client devices may also be bots that perform automated tasks independent of user control. Some bots may be benign and may be operated by trusted entities, such as certain search engine crawlers, spiders, and web load testing tools. In some implementations, these bots may be whitelisted by a security sub-system, and be provided with information needed to generate a valid security token that can be used when requesting electronic resources in order to bypass one or more re-coding measures that would otherwise apply to the request. In some implementations, a particular client device may refer to any one or more of particular hardware devices, particular accounts, particular requests that match some criteria such as having an IP address is a particular range, or may be any request that includes a valid security token. Thus, security policies, for example, may be stored in association with one or more global client IDs that may be used by a trusted entity with any one or more computing devices to make a request. For example, an end user may make requests with any of a plurality of devices using the same global client ID assigned to the user, regardless of whether the request is made from the user's desktop computer, tablet, or mobile device.

In some implementations, the security system may receive requests either directly or indirectly from client devices. For example, the security system may operate as a reverse proxy server that receives requests from client devices before they are forwarded to a web server that hosts resources identified in the request. In some implementations, requests may be received by the web server before the security system, and served resources and other responses to the requests are provided to the security system before being transmitted to the client devices.

At box 304, the electronic resource specified in the request is obtained by the security system. The electronic resource may have one or more components hosted by one or more web servers on one or more domains. All or some of the components may be obtained at box 304 of the process 300. For example, a web page that includes HTML code may also include images, style sheets, and advertisements hosted by other web servers from one that hosts the HTML code. The security system may obtain particular ones of these other components in addition to the HTML code so that any applicable re-coding measures can be coordinated among each of the components of the resource. For example, a re-coding measure that modifies the 'id' value of elements within HTML code may make corresponding changes in a style sheet that also uses the same 'id' value being modified.

At box 306, the process 300 determines whether a security token has been received in conjunction with the request. Security tokens may be included in the requests themselves, or may be provided separately but in connection with a request. In some implementations, a security token may be included in the request as an HTTP header value. The HTTP header may be a particular header that is agreed to between the client device and the security system. The header name may be any unreserved string agreed to between the client device and the security system. For example, the header name "Secure-User-Agent" will be referred to in this paper as the HTTP header that holds the security token in a request. Other header names may also be used. Accordingly, an HTTP request can be checked to determine whether the agreed header is included in the request. If the request does not include the header, then other locations for the security token may be checked, or it may be determined that no security token has been received and the process 300 continues to box 310.

If the process 300 determines that a security token has been received in conjunction with the request from the computing device, the process 300 can determine, at box 308, whether the security token is valid. If the security token is valid, then particular security countermeasures may be selected to be applied to the electronic resource requested by the computing device. The particular security countermeasures selected may include no security countermeasures, in some implementations, so that the computing device may be permitted to bypass a set of default countermeasures because the valid security token authenticates that the computing device is trusted. If the security token is not determined to be valid such that the computing device cannot be authenticated by the security system, then the process 300 may proceed to box 310, where one or more default security countermeasures are selected to be applied to the electronic resource. In some implementations, the default configuration may be to apply none or a smaller subset of available countermeasures, and if the security token is validated, then particular countermeasures are selected to be applied to the electronic resource that would not have been applied if the security token was not included or was not determined to be valid. An example process 400 for validating a security token is described further below with respect to the flowchart shown in FIG. 4.

At box 312, the process 300 identifies uses the security token to identify applicable security countermeasures to apply to the requested electronic resource. In some implementations, many different countermeasures may be available to the security system to apply to a particular electronic resource. Depending on the particular security token received with the request for the electronic resource and whether the security token is determined to be valid, different combinations of the available countermeasures may be selected to apply to the electronic resource before it is ultimately served to the computing device. For example, a valid security token may indicate that the request is made by a trusted computing device that has been whitelisted such that all or some of the countermeasures can be bypassed. When particular countermeasures are bypassed, the computational expense associated with re-coding the resource based on the particular countermeasures is reduced or eliminated. Additionally, the end-to-end latency to serve a requested electronic resource to a computing device may also be reduced by bypassing particular security countermeasures due to fewer re-coding operations being performed on the electronic resource.

Generally, the security countermeasures are configured to interfere with the ability of malware to interact with an electronic resource on a computing device. In some implementations, security countermeasures may also, or alternatively, be configured to identify information about computing devices executing an electronic resource. Some security countermeasures may monitor interaction with an electronic resource, by users, malware, other software, or a combination of these, and may report information about the computing device and about detected interaction with an electronic resource to a central security system. The central security system may then aggregate such information from many devices and analyze the information to determine signals that indicate whether various types of interaction with an electronic resource is more likely benign (e.g., authorized user interaction) or malicious (e.g., malware).

In some implementations, applying a security countermeasure to an electronic resource can involve re-coding the electronic resource to incorporate computer code that is usable to implement the countermeasure. For example, HTML code for a web page can be modified by inserting HTML code, changing particular portions of the HTML code, or removing portions of HTML code to generate a re-coded web page that is configured to interfere with or to detect the ability of malware to interact with the web page when executed by a computing device. In some implementations, particular components of an electronic resource can be re-coded in coordination with each other so as to not break the functionality of the resource. For example, HTML, CSS, and JavaScript for a web page may be re-coded together in a manner that maintains the functionality of the web page. In some implementations, re-coding an electronic resource can be done without substantially affecting how the presentation of the resource when executed by a computing device. Thus, a web page may be re-coded in a way that prevents or makes it more difficult for malware to interact with the web page on a computing device, even though the re-coded web page is displayed in substantially the same way as the original web page before countermeasures were applied. Therefore, the security countermeasures can be applied in a manner that is transparent to a user who interacts with an electronic resource on a computing device because the original and re-coded resources have a substantially equivalent functionality and appearance.

One or more of the available security countermeasures can include re-coding structural, functional, and/or stylistic elements of an electronic resource. For web pages, HTML, JavaScript, CSS, and other forms of web code may be modified, inserted, or removed, for example, to make more difficult attempts by malicious software to interact with web code for the web page. For example, man-in-the-browser (MITB) malware may compromise a browser on a computing device and may be capable of monitoring user interaction with a web page (even a secured web page), performing illicit transactions using the web page's connection to a web server without the user's knowledge, or may even change the content of a web page to trick a user into providing private information to a malicious entity. By re-coding portions of code of a web page, MITB bots or other malware may be prevented from properly interpreting the code of a web page, or may be prevented from identifying which elements that the malware should interact with.

In some implementations, the security countermeasures can include re-coding an electronic resource every time it is served so that different re-coded versions are served each time that a common electronic resource is requested by different computing devices, or when the common electronic resource is requested by a particular computing device across multiple sessions. For example, an HTML form field of a banking web page whose 'id' value is 'account-number' in the original web page code may be re-coded with a new 'id' value that is randomly generated, such as "$gha7Uo5aA." A new form field 'id' value may be generated by the security system each time the same banking page is requested and served to a computing device so that malware on the computing device cannot know which form field is the 'account-number' field before the page is served. If the form field is styled by a style sheet, CSS code for the page may be changed so that a CSS selector that is programmed to style the form field refers to the re-coded 'id' rather than the original 'id.' Likewise, interpretive code such as JavaScript that adds functionality to the web page may be changed in a coordinated manner with other components of the web page.

One or more security countermeasures may include inserting elements into an electronic resource. For example, a web page that has a set of input fields in the original page may be re-coded to add additional input fields. Some of the input fields may be hidden when the web page is presented on a computing device so that it appears to a user as if only original input fields are included in the web page. However, the inserted fields may be difficult for malware on the computing device to discriminate from the original fields, thereby deterring the ability of malware to effectively interact with or monitor the web page. In some implementations, input fields on a web page or other document may be split into multiple fields. For example, a first original text input field may be split into five different input fields that are all visible and all overlaid directly on one another in a presentation of the re-coded web page. As a user types into what appears to the first original text input field, the entered characters may be automatically caused to alternate into respective ones of the split input fields so that no one input field collects all of the information entered by the user. Data collected from the split input fields can be submitted and re-assembled by the security system, for example, remote from the computing device. The re-assembled data can then be provided to the applicable web server.

In some implementations, one or more of the security countermeasures can include modifying the textual content (e.g., a block of displayed text) of an electronic resource so that the textual content is obfuscated in the resource code, but is nonetheless caused to display correctly when the resource is executed by a computing device. Such countermeasures can be achieved in some implementations by randomly scrambling the font that is used to display the textual content. The font can be scrambled by re-mapping character codes with glyphs (the graphical representations of characters) in the font file used to display the textual content. For example, the hexadecimal character code for 'A' in a normal Unicode font file is 0x0041. In a scrambled font file, the character code 0x0041 may cause a different random character to be displayed, such as 'J,' '8,' or '$.' The textual content of the electronic resource can then be obfuscated by rewriting the textual content based on how characters are scrambled in a particular font file. For example, a character in textual content for 'J' may be rewritten to the character code 0x0041. When the character is displayed with a font that maps 0x0041 to 'J', rather than 'A', the 'J' character displays correctly despite being obfuscated in the resource code.

One or more of the security countermeasures available to the process 300 can include serving instrumentation code in conjunction with the electronic resource that monitors interaction with the resource on the computing device. In some implementations, the instrumentation code may be inserted into resource's original code, or it may be provided separately from the original code. Instrumentation code can monitor interaction with the resource and collect information about the interactions. For example, the instrumentation code, which can be executable on the computing device, may detect when a user inputs and submits information in a form on the web page, when a user clicks on a hyperlink from the web page, when an asynchronous communication is made from the web page, or when any event occurs within the document object model (DOM) of the web page. The instrumentation code may log interaction events with the resource and transmit information about the interaction events to a security server for analysis, for example. In some implementations, the instrumentation code may log interaction events regardless of whether the events result from legitimate user interaction with the resource, from legitimate third-party interaction (e.g., a browser plugin), or from malware. For example, if a bot attempts to send an asynchronous communication to a web server in an authenticated session without the user's knowledge, the instrumentation code may log and report information about the attempt so that the attempt may be blocked, or may be analyzed for circumstantial information that indicates a likelihood that the attempt is legitimate or malicious. In some implementations, instrumentation code may also identify and report information about a computing device or computing session such as the type of device, the browser used to view a web page, indications of other software or plug-ins installed in the browser, etc. Such information may be aggregated with similar information reported from other devices and analyzed to determine when computing devices may be compromised by bots, for example.

The particular security countermeasures selected at box 312 may be selected along various different lines. In some implementations, the process 300 may select one or more countermeasures of particular types. For example, two types of countermeasures—instrumentation code insertion and content modification—may be selected, while other types of countermeasures such as implicit API (e.g., hyperlink and form field value) obfuscation may be excluded. In some implementations, different levels of countermeasures may be selected that correspond to varying degrees of obfuscation and re-coding. For example, a low level of obfuscation may apply a relatively small amount of re-coding that may be less robust but more efficient than applying a high level of obfuscation, which may be relatively more robust at interfering with malware attempts to interact with the re-coded resource but that is computationally more expensive to re-code.

In some implementations, the selected countermeasures may be selected based on an identity of the computing device making the request. The process 300 can identify the computing device and determine which, if any, countermeasures are to be applied to the electronic resource served in response to the request. The selection of countermeasures may be pre-defined in some examples based on the particular computing device making a request. For example, a security system carrying out the process 300 may be configured to trust requests from a particular search engine bot that crawls and indexes public information on the internet. Accordingly, once the search engine bot is authenticated (e.g., using a security token), the security system may identify a security policy for the search engine bot that specifies that no countermeasures are to be applied to resources requested from the search engine bot.

Security policies may generally correlate computing device identifiers or other client identifiers with information about how to respond to requests from such computing devices. For example, some requestors that are known to be bad actors may be blacklisted so that no resource is sent in response to requests from devices belonging to such requestors. Other requestors may be trusted and may have previously been provided with information usable to generate a valid security token. Security policies for trusted computing devices may specify different sets of countermeasures to apply to resources that are sent in response requests from the trusted computing devices than what would apply by default if the computing devices were not trusted. For example, one or more default countermeasures may not apply for a trusted device, or no countermeasures at all may be applied to resources served to a trusted device.

In some implementations, the security policy may specify which portions of a resource that countermeasures are to be applied to, or may specify levels of countermeasures that should be applied to a resource. For example, a trusted computing device may request a web page from an e-commerce site to purchase an item. The page may accept pertinent data for the purchase transaction such as user identification, shipping address, payment information, and other sensitive information. By default, a security system may be configured to re-code the entire web page with a relatively high level of obfuscation. However, a computing device that requests the page that is trusted or otherwise determined to be at low risk for a security vulnerability may be re-coded according to a security policy that specifies applicable countermeasures for only a portion (rather than the entire) web page code. The web page may also be re-coded for the trusted device with a relatively lower level of obfuscation that is more efficient to re-code. For an untrusted computing device or a device that is otherwise determined to be at high risk for a security vulnerability, more stringent countermeasures may be applied in serving resources to the device. For example, additional countermeasures, additional portions of code, and/or higher levels of obfuscation may be applied to resources served to higher risk devices than what may otherwise be applied by default.

Particular countermeasures may also be selected based on a security token received with the request for a resource. For example, the validation of a security token may indicate by itself that a computing device is whitelisted and that no security countermeasures are to be applied to the requested resource. In some implementations, the security token may include specific information that indicates how countermeasures are to be applied to the requested resource. For example, different types of security tokens may correspond to different countermeasures, or the security tokens may include explicit information that indicates which countermeasures are applicable to the particular computing device that made the request.

At box 314, the process 300 identifies whether there are any applicable security countermeasures to apply to the requested electronic resource. If no countermeasures apply, then the process 300 proceeds to box 316 and the electronic resource can be served to the computing device without the resource being re-coded. If countermeasures are determined to apply, whether by default (box 310) or for a request from a device having a validated security token (box 312), then the process 300 can proceed to box 318, where the electronic resource is re-coded based on the particular countermeasures that were determined to be applicable. At box 320, the re-coded resource is sent to the computing device.

Figure 4:
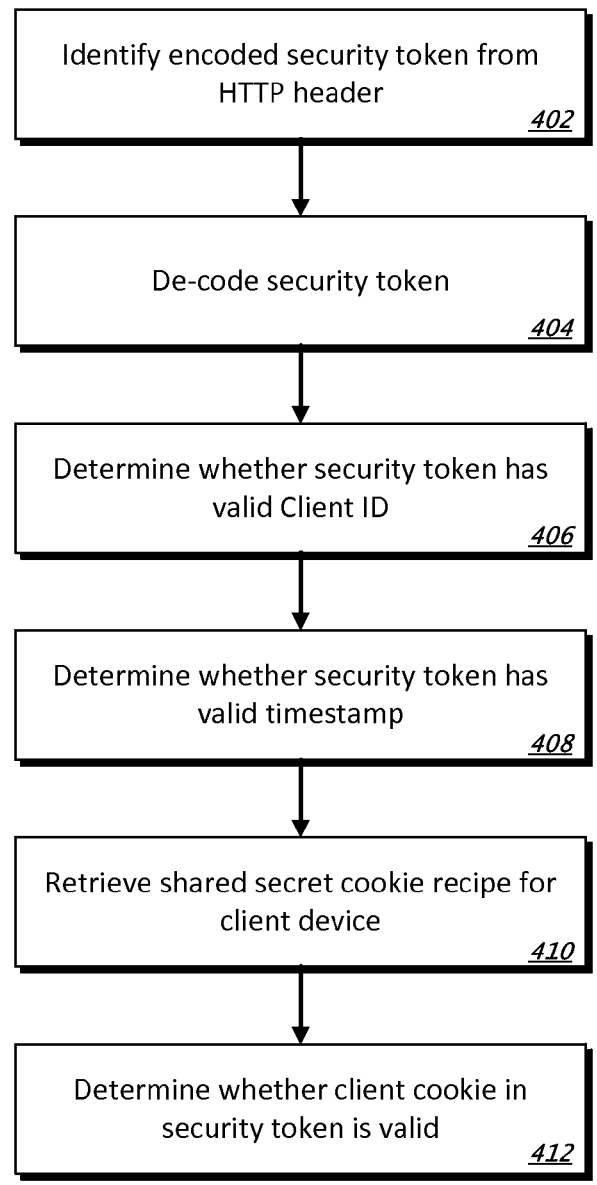
FIG. 4 depicts a flowchart of an example process for processing a security token that has been received by a security system in conjunction with a request for an electronic resource from a computing device.

FIG. 4 is a flowchart of an example process 400 for processing a security token that has been received in conjunction with a request for an electronic resource from a computing device. The process 400 can include determining whether a security token is received with a request, and if so, determining whether the token is valid. For example, the process 400 may include the operations of at least boxes 306 and 308 of the process 300 depicted in FIG. 3. In some implementations, the process 400 may operate on security tokens having a configuration like the example security token 508 in FIG. 5. For example, the security token may comprise a unique Client ID, a timestamp, and a client cookie. The Client ID may be a globally unique identifier that is assigned to particular entities or computing devices. For example, a trusted organization that operates a web search crawling bot may be assigned one or more Client IDs that are reserved for that organization.

When the organization's search bot crawls a site that is subject to application of security countermeasures, the bot can provide a unique Client ID for the organization with requests to access resources on the site so that, for example, one or more of the security countermeasures can be bypassed. A security system for the site may have accounts for clients identified by the Client ID. For example, a shared secret cookie recipe and a security policy may associated with a Client ID, so that the Client ID can be used to look-up the appropriate cookie recipe and security policy. Other information that may be included in a security token, such as a timestamp and client cookie are described further below with respect to FIG. 5. Generally, the timestamp indicates a time associated with the request for an electronic resource. The client cookie is generated by a computing device, or by another computing system associated with the computing device before the security token is received by a security system that applies countermeasures to requested resources, and uses a shared secret recipe to generate the client cookie, the recipe being known to the computing device and the security system. The recipe can use information that is ascertainable by the security system from a request (e.g., IP address, HTTP header values), to generate the client cookie. Even though the cookie may be generated by detectable information from a network request, only a client that knows the secret recipe can formulate the cookie correctly. Therefore, the client cookie operates as a form of authentication for a requesting computing device to a security system.

At box 402, the process 400 identifies an encoded security token that is received with a request for an electronic resource. In some implementations, the encoded security token is identified from the value of a particular HTTP header field. For example, a new HTTP header field, such as "Secure-User-Agent," may be used to hold a security token value. The header field and corresponding security token may be generated and inserted into a request by a software module on a computing device or by another system (e.g., a forward network proxy), before the request is transmitted over the Internet. The security token may be encoded in some implementations. For example, a plain text security token may be encrypted by the computing device using a 64-bit key with an Advanced Encryption Standard (AES) technique. The encrypted token can be decrypted (decoded) by the security system to reveal the plain text security token, including the Client ID, timestamp, and client cookie, for example. In some implementations, the security token may be provided in header fields for other network layers associated with a request. The security token may also be split among multiple header fields in some implementations.

At box 404, the encoded security token is decoded. For example, an AES-encrypted security token can be decoded by a security system using a symmetric key. The de-coded, plain text security token can be used for further processing in boxes 406-416 of the process 400.

At boxes 406-412, the process 400 determines whether a security token received with a request is valid by checking one or more features of the security token. In some implementations, the Client ID, timestamp, and client cookie can each be analyzed to determine the validity of the security token. At box 406, the Client ID is identified from the de-coded security token. The process 400 can determine whether the Client ID is valid. For example, a security system may check whether the Client ID provided in the security token is assigned to a trusted or otherwise known entity. If so, then the timestamp provided in the security token may be checked against a start time, an expiration time, or both, for which security privileges have been granted. For example, a shared secret recipe provided to an entity that is usable to generate at least a portion of the security token, such as the client cookie, may be valid for only a limited time. If the shared secret recipe is used to generate a client cookie outside of a defined time window, then the client cookie (and thus the security token as a whole) may be invalid. If the timestamp falls within the defined window of time for the recipe, then the client cookie may be further evaluated to determine the validity of the security token.

The validity of the client cookie is determined in boxes 410-412. The client cookie may be generated using a shared secret cookie recipe that is known to both the computing device and the security system that receives and determines the validity of the security token. The shared secret cookie recipe may be generated by the security system and provided at particular times to trusted clients. Cookie recipes may be updated periodically or otherwise from time to time so that once a particular recipe has been in use for some time, that recipe will expire and a new recipe is activated. The shared secret cookie recipe can specify how the client cookie is to be generated.

In some implementations, the cookie recipe includes instructions for generating a client cookie using standard network header values such as internet protocol (IP), transmission control protocol (TCP), and hypertext transfer protocol (HTTP) headers. The cookie recipe can be in the form of a mask value on standard IP, TCP, and HTTP headers, for example. All or a portion of one or more such header values may be combined and encoded as specified by the cookie recipe. For example, a client cookie may first be formulated by appending a portion of the HTTP User-Agent field value to the IP address. The TCP source port may then be repeated three times and interleaved at particular positions within the User-Agent-IP Address string, for example. The specific combinations of header values, or of other data included with a request for an electronic resource, can be different for different clients and can change for a particular client each time that a new cookie recipe is activated for that client. Even though the cookie recipe is generated based on data that is detectable from a request, the manner in which the client cookie is formed is secret, and therefore only authorized clients who have the shared secret can generate a valid client cookie. In some implementations, other data can be incorporated into the formulation of a client cookie. For example, the cookie recipe may specify that the Client ID or timestamp is to be used in formulating the cookie.

Other public or secret information that is known or accessible to both the client and the security system can be used to generate the client cookie. For example, a portion of a public document such as the first paragraph of a Sherlock Holmes novel may be used alone or in combination with other data to form the client cookie. In some implementations, the cookie recipe may specify that the formulation dynamically changes based on one or more factors that are known or accessible to both the client and the security system. For example, the formulation may change based on the timestamp associated with a request for an electronic resource. The cookie recipe may include an algorithm that determines a formulation for the client cookie based on a time associated with the request for the electronic resource. For example, the full IP address may be used in the client cookie at some times, while only a portion of the IP address may be used at other times.

Once a raw client cookie has been generated based on particular information indicated by the shared secret cookie recipe, the raw client cookie can be encoded to its final form for inclusion in the security token. In some implementations, the raw client cookie can be compressed, such as by a standard algorithm (e.g., using gzip on the raw client cookie). The compression may or may not be lossless. In some implementations, an MD5 hash can be performed on the raw client cookie. The raw client cookie can be encrypted using one or more cryptographic techniques. In some implementations, the encoded client cookie is used in the plaintext security token, which token is then further encoded in its entirety to generate the encoded (e.g., encrypted) security token that is transmitted in the Secure-User-Agent (or other HTTP header) field. In some implementations, the raw client cookie is not hashed or otherwise encoded before being included in the plaintext security token, and then then security token as a whole (e.g., the Client ID, timestamp, and raw client cookie) are encoded (e.g., encrypted) for transmission with the request to the security system.

At box 410, the process 400 retrieves the shared secret cookie recipe that is applicable for the computing device that requested the electronic resource. For example, the applicable recipe may be identified by a lookup using the Client ID indicated in the security token. The applicable recipe may match the recipe that was used by the computing device to generate the client cookie. If the computing device correctly used the applicable recipe to generate the cookie, then the cookie may be determined to be valid. A valid cookie indicates that the computing device is in possession of a valid shared secret cookie recipe, and it follows that the computing device appears to be properly associated with the Client ID. Therefore, the client cookie can be used as part of the security token to authenticate a requesting device with the security system.

At box 412, the validity of the client cookie is determined. The validity of the client cookie can be determined by comparing the client cookie extracted from a received security token to information determined by the security system using the applicable shared secret cookie recipe and related information. For example, the security system can generate a client cookie according to the applicable cookie recipe that was identified at box 410. Using the cookie recipe and information specified by the cookie recipe (e.g., IP address, TCP header values, HTTP header values, etc.), the security system can generate a client cookie in a like manner to how the requesting computing device generated the client cookie. If the client cookie obtained from the request matches the client cookie generated by the security system, then the process 400 determines that the client cookie obtained from the request is valid. If the cookies do not match, then the cookie obtained from the request is determined to be invalid.

In some implementations, other techniques can be employed to determine the validity of a client cookie as well. For example, a cookie extracted from the security token may be de-coded using operations inverse to those used to encode the cookie at the computing device. The de-coded security token can then be parsed to identify the various components of data that were used to generate the security cookie. For example, the IP address of the requesting computing device may be reconstructed from the cookie if the cookie recipe called for the IP address to be used in generating the cookie. The IP address may then be compared with the IP address associated with the request for an electronic resource to verify that the IP address reconstructed from the cookie matches what is expected. Other parameters specified by the cookie recipe and used to generate the client cookie can be reconstructed and verified in a similar manner.

Figure 5:
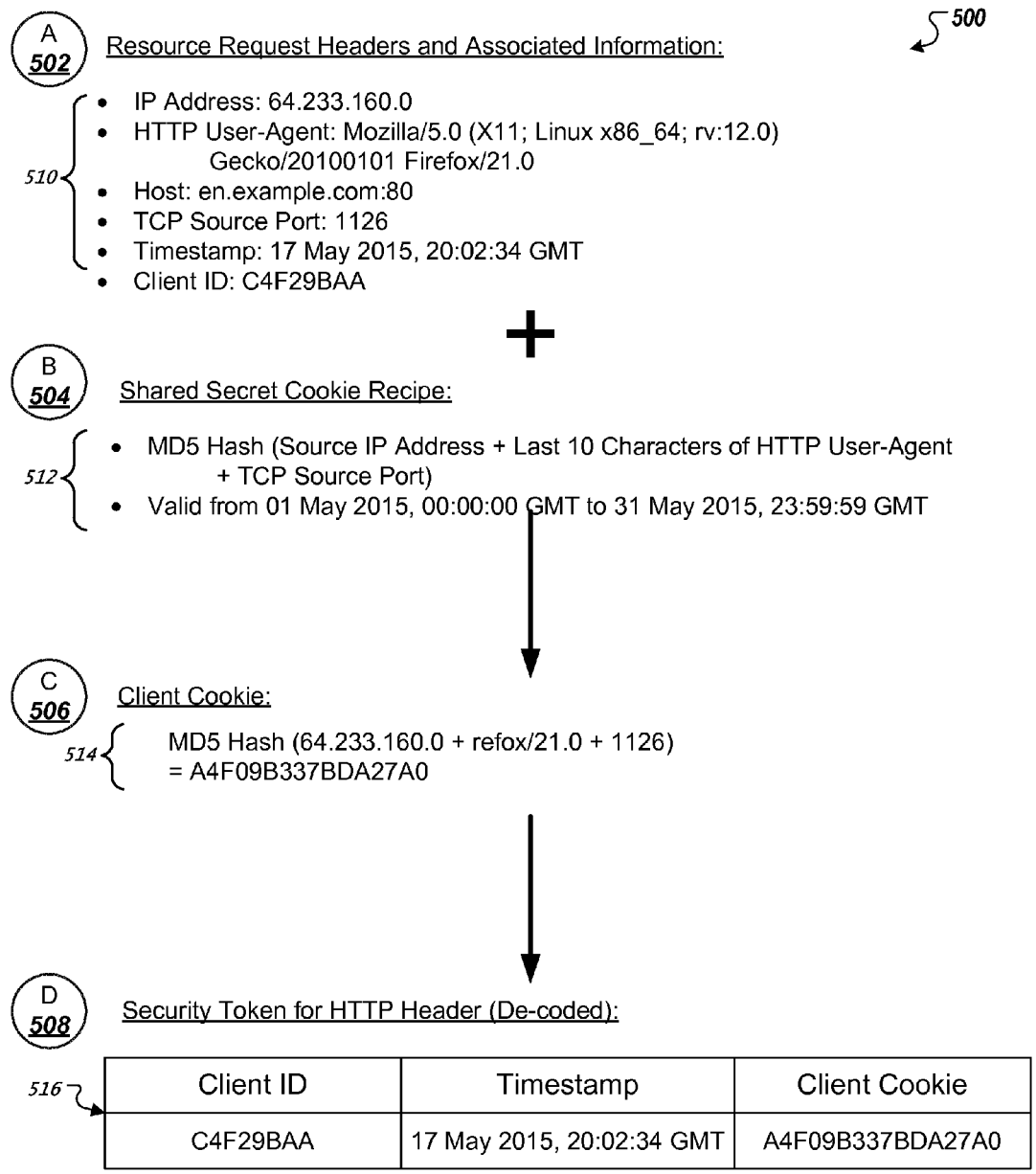
FIG. 5 shows an example process for generating a security token.

FIG. 5 shows an example process 500 for generating a security token. The process 500 may be carried out by a computing device for a client entity that has been granted privileges by a network security operator, for example. The network security operator may provide the client entity with one or more shared secret cookie recipes that can be used by the client entity to generate at least a portion of a security token. The security token can be provided as part of a request, or otherwise in association with a request, from a computing device for an electronic resource. The security token may include a client cookie which has been generated using one of the shared secret cookie recipes. One example of generating a security token is depicted by the process 500 in FIG. 5. In some implementations, the security token may be generated by the computing device that makes the request. In some implementations, the security token may be generated by another device that intercepts the request from the computing device, and inserts a security token into the request. For example, the requesting computing device may reside behind a proxy server that is configured to insert security tokens into particular requests before they are ultimately transmitted to their addressed destination.

At stage A (502), particular information 510 is identified for use in generating a security token 516. The information may include a Client ID that indicates an identity of the requesting computing device or an entity associated with the requesting computing device. A timestamp may be identified that is associated with the request. In some implementations, the timestamp may indicate a date and time that the request is submitted or that the security token is generated. Additional information may be identified as well as parameters for the creation of the client cookie. The additional information is generally known to or accessible to both the computing device that makes the request, and a security system that receives the request and processes the client cookie to determine whether it is valid. In some implementations, the additional information is identified from one or more header values at particular layers of the request, such as HTTP, IP, and TCP header values. For example, the identified information 510 as shown includes the IP address, HTTP User-Agent, Host, and TCP Source Port of the computing device from which the request is made.

At stage B (504), a shared secret cookie recipe is identified. The shared secret cookie recipe indicates how a valid client cookie is to be generated, and may also indicate how other portions of the security token are to be generated in some implementations. In the example of FIG. 5, the cookie recipe 512 includes instructions for generating a client cookie, and is valid for a specified time in May 2015. If the cookie recipe is used outside of the May 2015 window, the resulting client cookie will not be valid if the cookie recipe is expired or changed. The shared secret cookie can identify a manner in which various parameters from the identified information 510 are pieced together to produce a raw client cookie. For example, the raw client cookie as specified by cookie recipe 512 is "Source IP Address+Last 10 Characters of HTTP User-Agent+TCP Source Port." The raw client cookie can then be encoded to obfuscate or compress the plain text of the parameters in the raw client cookie. For example, an MD5 hashing algorithm may be applied to the raw client cookie, or the raw client cookie may be encrypted in any number of ways. In some implementations, the raw client cookie is not encoded and the raw client cookie is provided in the security token with one or more other pieces of information, which is then encoded (e.g., hashed or otherwise encrypted) as a whole.

At stage C (506), the client cookie 514 is generated using the shared secret cookie recipe and relevant parameters. At stage D (508), the security token 516 is generated using the Client ID, timestamp, and the client cookie. In some implementations, these pieces of information and other information can be combined to generate a security token. The security token from the combined information may be raw, and may be further encoded, for example by a hashing or another encryption algorithm, which encoded token may then be submitted with the request for an electronic resource.

Although the techniques related to security tokens and client cookies described throughout this paper may provide a reliable means for trusted clients to authenticate themselves with a security system, other authentication techniques may be employed in some implementations. In particular, different authentication techniques may be used for different clients depending on one or more factors associated with the clients. Clients that make requests over an unsecure network, such as the Internet that that are more vulnerable to malicious attacks or unwanted snooping may use the robust security token and client cookie-based techniques described herein. Less secure authentication may be used when requests are made over networks that are less vulnerable to attacks or unwanted snooping. For example, if a computing device that requests a resource is in the same subnet as the security system, then only the source IP address may be used as a unique identifier of the computing device. In some implementations, the security system may automatically select a particular authentication technique based on the setup of the network over which requests are received from computing devices.

Figure 6:
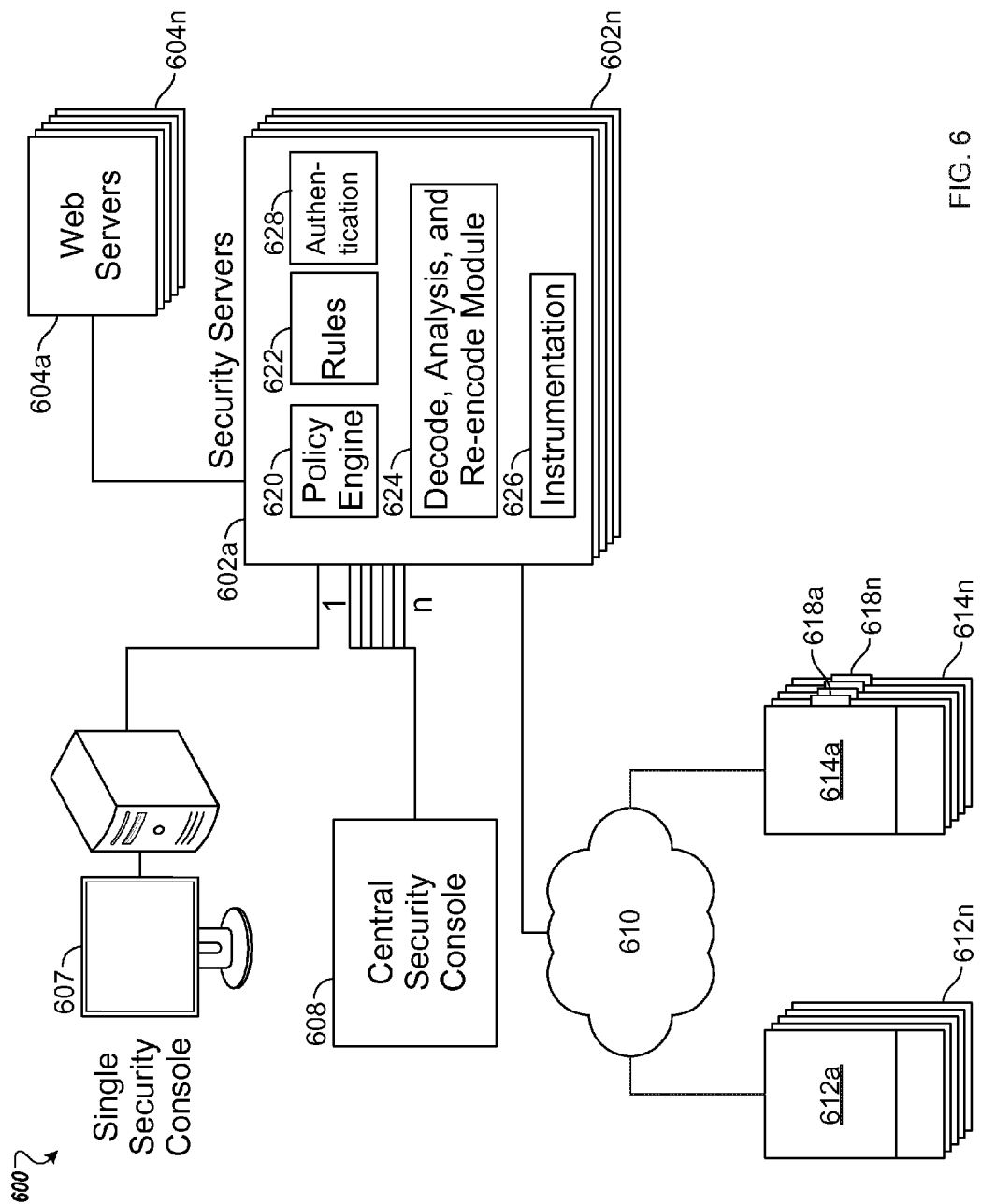
FIG. 6 shows an example system for applying security countermeasures including serving polymorphic and instrumented code.

FIG. 6 shows a system 600 for serving polymorphic and instrumented code. The system 600 may be adapted to perform deflection and detection of malicious activity with respect to a web server system. In some implementations, deflection and detection of malicious activity is achieved by applying security countermeasures to electronic resources that are to be served responsive to requests from computing devices. The system 600 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 604*a*-604*n*, and could include a broad array of web servers, content servers, database servers, financial servers, load balancers, and other necessary components (either as physical or virtual servers)

A set of security systems 602*a* to 602*n* are shown connected between the web servers 604*a* to 604*n* and a network 610 such as the internet. Although both extend to n in number, the actual number of sub-systems could vary. For example, certain of the customers could install two separate security systems to serve all of their web server systems (which could be one or more), such as for redundancy purposes. The particular security systems 602*a*-602*n* may be matched to particular ones of the web server systems 604*a*-604*n*, or they may be at separate sites, and all of the web servers for various different customers may be provided with services by a single common set of security servers 602*a*-602*n* (e.g., when all of the server systems are at a single co-location facility so that bandwidth issues are minimized).

Each of the security systems 602*a*-602*n* may be arranged and programmed to carry out operations like those discussed above and below and other operations, such as to apply countermeasures for deflection and detection of interaction with electronic resources on client computers. For example, a policy engine 620 in each such security system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module 624, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 602a-602n, such as by the security servers 602a-602n implementing a web crawler (not shown to recursively search for new and changed content and to report such occurrences to the security servers 602a-602n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 622 may store analytical rules for performing such analysis and for re-encoding of the content. The rules engine 622 may be populated with rules developed through operator observation of particular content types, such as by operators of a system studying typical web pages that call JavaScript content and recognizing that a particular method is frequently used in a particular manner. Such observation may result in the rules engine 622 being programmed to identify the method and calls to the method so that they can all be grouped and re-encoded in a consistent and coordinated manner.

The decode, analysis, and re-encode module 624 encodes (i.e., re-codes) content being passed to client computers from a web server according to relevant policies and rules. The module 624 also reverse encodes requests from the client computers to the relevant web server or servers. For example, a web page may be served with a particular parameter, and may refer to JavaScript that references that same parameter. The decode, analysis, and re-encode module 624 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security system 602 along with an identifier for the particular client computer so that the system 602 may know which key or function to apply, and may otherwise maintain a state for the client computer and its session. A stateless approach may also be employed, whereby the system 602 encrypts the state and stores it in a cookie that is saved at the relevant client computer. The client computer may then pass that cookie data back when it passes the information that needs to be decoded back to its original status. With the cookie data, the system 602 may use a private key to decrypt the state information and use that state information in real-time to decode the information from the client computer. Such a stateless implementation may create benefits such as less management overhead for the server system 602 (e.g., for tracking state, for storing state, and for performing clean-up of stored state information as sessions time out or otherwise end) and as a result, higher overall throughput.

The decode, analysis, and re-encode module 624 and the security system 602 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 624 may be adapted to apply different modifications to each instance of a common web resource, or common portion of a web resource, such that the web code that it is ultimately delivered to the client computers in response to each request for the common web resource includes different modifications.

Even where different modifications are applied in responding to multiple requests for a common web resource, the security system 602 can apply the modifications in a manner that does not substantially affect a way that the user interacts with the resource, regardless of the different transformations applied. For example, when two different client computers request a common web page, the security system 602 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

In some implementations, the decode, analysis, and re-encode module 625 can be configured to identify one or more strings of text in a document and to obfuscate those strings of text before the document is transmitted to a client device. A font definition may also be provided to the client device that is arranged to cause the client device to display obfuscated text with glyphs that are equivalent to the original characters that were substituted for obfuscated characters. Thus, without de-obfuscating the strings of text, the client device uses a particular font definition to generate a display of the obfuscated text that is equivalent to the original text.

An instrumentation module 626 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 602 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 602, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 604a-604n, as encoded by decode, analysis, and re-encode module 624, may be rendered on web browsers of various client computers. Uninfected client computers 612a-612n represent computers that do not have malicious code programmed to interfere with a particular site a user visits or to otherwise perform malicious activity. Infected client computers 614a-614n represent computers that do have malware or malicious code (618a-618n, respectively) programmed to interfere with a particular site a user visits or to otherwise perform malicious activity. In certain implementations, the client computers 612, 614 may also store the encrypted cookies discussed above and pass such cookies back through the network 610. The client computers 612, 614 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 612, 614. For small-scale analysis, each web site operator may be provided with a single security console 607 that provides analytical tools for a single site or group of sites. For example, the console 607 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

The security servers 602a-n may also include an authentication module 628. The authentication module 628 can identify whether the client computers 612, 614 are registered with the security servers 602a-n. The authentication module may analyze one or more parameters from a request from the client computers 612, 614 to determine whether the request is associated with a registered entity. Some entities may be registered, for example, because they have been determined to be trustworthy and to pose little risk of a malware or other security threat. Those entities may be included in a whitelist that indicates that all or some of the security countermeasures (e.g., encoding, decoding, re-encoding, and instrumentation techniques) that the security servers 602a-n would normally (e.g., by default) apply to resources served to the client computers 612, 614 can be bypassed. The authentication module 628 may evaluate a security token 628 that the client computers 612, 614 provide with a resource request in order to authenticate the client computers 612, 614 as being associated with an entity registered with the security servers 602a-n. A client computer 612, 614 can be authenticated in some implementations if the security token is determined to have been properly generated using a valid shared secret key known to the authentication module 628. If a request from a client computer has been authenticated, then none, one, or more particular security countermeasures may be determined to apply to the resource that is served in response to the request.

Console 607 may also be multiple different consoles used by different employees of an operator of the system 600, and may be used for pre-analysis of web content before it is served, as part of determining how best to apply polymorphic transformations to the web code. For example, in combined manual and automatic analysis like that described above, an operator at console 607 may form or apply rules 622 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 608 may connect to a large number of web content providers, and may be run, for example, by an organization that provides the software for operating the security systems 602a-602n. Such console 608 may access complex analytical and data analysis tools, such as tools that identify clustering of abnormal activities across thousands of client computers and sessions, so that an operator of the console 608 can focus on those clusters in order to diagnose them as malicious or benign, and then take steps to thwart any malicious activity.

In certain other implementations, the console 608 may have access to software for analyzing telemetry data received from a very large number of client computers that execute instrumentation code provided by the system 600. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 608 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 600, may be blocked from interaction, or may have their operators notified that their computer is potentially running malicious software (e.g., by sending an e-mail to an account holder of a computer so that the malicious software cannot intercept it easily).

Figure 7:
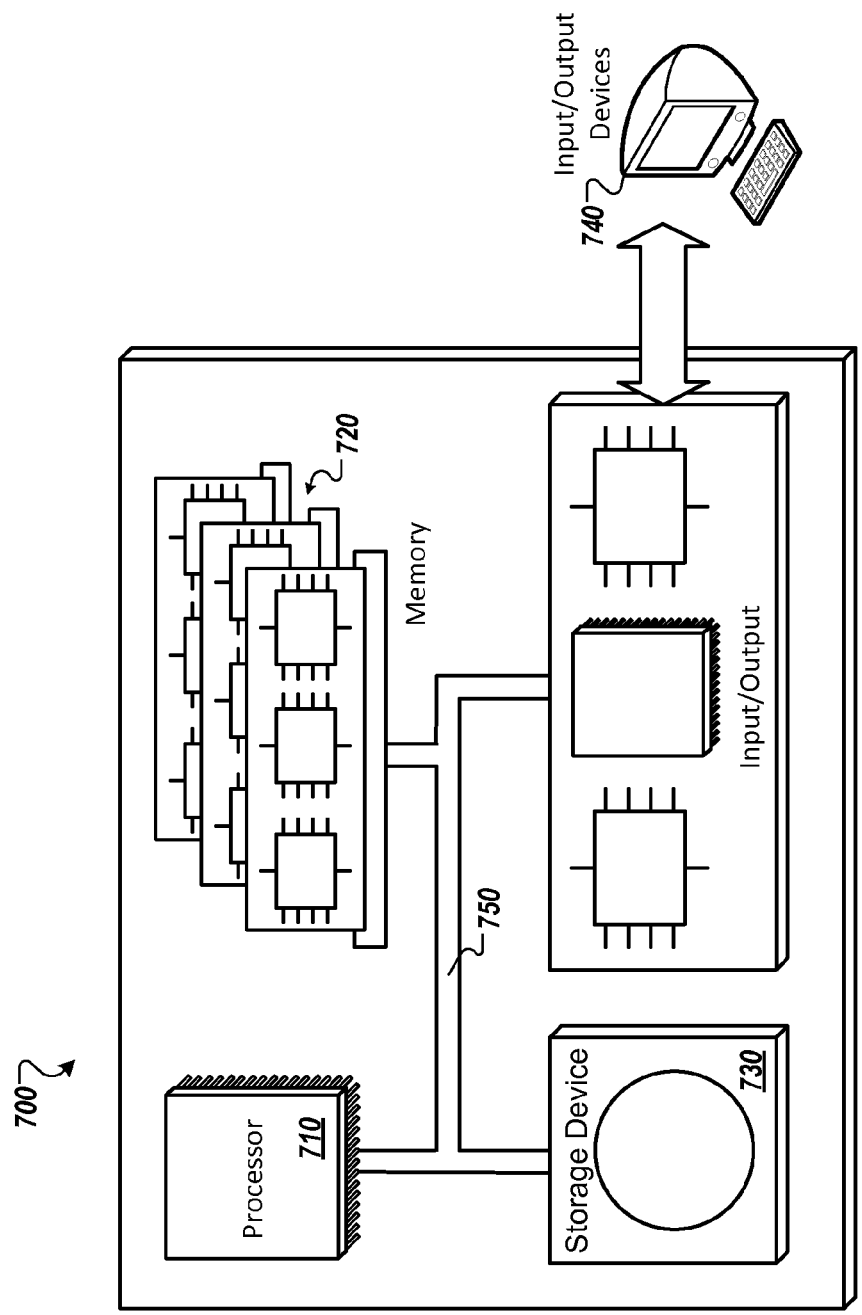
FIG. 7 is a block diagram of a generic computer system for implementing the processes and systems described herein.

FIG. 7 is a schematic diagram of a computer system 700. The system 700 can be used for the operations described in association with any of the computer-implemented methods described previously, according to one implementation. The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 400. In one implementation, the storage device 730 is a computer-readable medium. In various different implementations, the storage device 730 may be a floppy disk device, a hard disk device, an optical disk device, or a tape device.

The input/output device 740 provides input/output operations for the system 400. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for determining a manner in which to re-code an electronic resource, comprising:

receiving, by a computing system and as having been sent from a computing device remote from the computing system, a request for the electronic resource;

identifying, by the computing system, a security token received from the computing device along with the request;

identifying, based on a value of the security token that identifies a particular entity that submitted the request, a security policy assigned to the particular entity that submitted the request;

selecting, based on the identified security policy assigned to the particular entity that submitted the request, a set of security countermeasures to apply to the electronic resource to be served in response to the request, the security countermeasures operating to interfere with an ability of malware to interact with the served electronic resource when the served electronic resource is on the computing device, wherein selecting the set of security countermeasures comprises selecting from among multiple different choices that include a first choice to apply no security countermeasures and a second choice to apply one or more particular security countermeasures;

in response to selecting the second choice to apply the one or more particular security countermeasures, re-coding first portions of the electronic resource that are to be executed on the computing device using the one or more particular security countermeasures; and serving a re-coded electronic resource having the re-coded first portions and other portions to the computing device in satisfaction of the request.

2. The computer-implemented method of claim 1, wherein: the one or more particular security countermeasures are configured to obfuscate code for the first portions of the electronic resource in a manner that does not substantially affect a presentation of the electronic resource when the re-coded electronic resource is executed on the computing device.

3. The computer-implemented method of claim 1, wherein the one or more particular security countermeasures includes at least one security countermeasure that is configured to insert, into code for the electronic resource, instrumentation code that is programmed to execute on the computing device and to monitor interaction by other resources on the computing device with the re-coded electronic resource.

4. The computer-implemented method of claim 1, wherein selecting the set of security countermeasures to apply to the electronic resource comprises choosing to apply a combination of two or more different countermeasures to the electronic resource from among a plurality of different available countermeasures, the two or more different countermeasures chosen to the exclusion of other ones of a plurality of different available countermeasures.

5. The computer-implemented method of claim 4, wherein different security policies assigned to different entities specify different combinations of countermeasures to apply to electronic resources that are to be served in response to respective requests for the electronic resources from the different entities.

6. The computer-implemented method of claim 1, wherein the computing system is configured to determine whether the security token received from the computing device is valid, and in response to determining that the security token is invalid, to select one or more default security countermeasures to apply to the electronic resource to be served in response to the request, wherein re-coding the first portions of the electronic resource comprises using the one or more default security countermeasures to re-code the electronic resource.

7. The computer-implemented method of claim 1, wherein the computing system is configured, in response to receiving a second request for an electronic resource that does not include a security token, to select one or more default security countermeasures to apply to the electronic resource to be served in response to the second request, and to use the one or more default security countermeasures to re-code the electronic resource requested in the second request.

8. The computer-implemented method of claim 1, wherein the security policy assigned to the particular entity that submitted the request indicates that the particular entity is a whitelisted entity so that, as a result of the particular entity being a whitelisted entity, the requested electronic resource is permitted to bypass one or more security countermeasures that would otherwise be applied to the electronic resource if the particular entity was not a whitelisted entity.

9. The computer-implemented method of claim 8, further comprising:

receiving, by the computing system and as having been sent from a second computing device remote from the computing system, a second request for the electronic resource;

identifying, by the computing system, a second security token received from the second computing device along with the second request;

identifying, based on a value of the second security token that identifies a second particular entity that submitted the second request, a second security policy assigned to the second particular entity that submitted the second request;

choosing, based on the second security policy designating the second particular entity as a whitelisted entity, to apply no security countermeasures to the electronic resource; and serving the electronic resource to the second computing device in satisfaction of the second request, wherein the electronic resource served to the second computing device is not re-coded using any security countermeasures.

10. The computer-implemented method of claim 1, wherein the security token is generated by the computing device based on a shared secret recipe known by the computing device and the computing system.

11. The computer-implemented method of claim 10, wherein the security token is generated by the computing device using information, specified in the shared secret recipe, from one or more internet protocol (IP), transmission control protocol (TCP), and hypertext transfer protocol (HTTP) header values that are associated with the request from the computing device and that are identifiable by the computing system from the request.

12. The computer-implemented method of claim 11, further comprising decoding, by the computing system, the security token using the shared secret recipe and the one or more IP, TCP, and HTTP header values that are identified from the request from the computing device.

13. The computer-implemented method of claim 10, wherein the security token is provided as a value of a particular HTTP header included in the request from the computing device.

14. The computer-implemented method of claim 10, further comprising determining whether the security token is valid by checking a timestamp included in the security token against at least one of a pre-defined start time and a pre-defined expiration time.

15. The computer-implemented method of claim 10, further comprising changing the shared secret recipe from time to time so that security tokens are caused to be generated by the computing device based on different shared secret recipes depending on the particular times at which the security tokens were generated.

16. A computer system for determining a manner in which to re-code an electronic resource, the system comprising:
one or more computers including one or more memories;
a request manager stored in the one or more memories in the one or more computers to receive requests for electronic resources from computing devices that are separate from the one or more computers and to obtain the electronic resources responsive to the requests;
a security token manager stored in the one or more memories in the one or more computers to identify security tokens in the requests from the computing devices and to determine, based on values of the security tokens, the identities of particular entities who submitted the requests;
a security policy manager stored in the one or more memories in the one or more computers to:
(i) identify corresponding security policies for the particular entities whose identities were determined by the security token manager, the security policies indicating whether security countermeasures are to be applied to electronic resources served to respective ones of the particular entities, and if so, which of a plurality of available security countermeasures are to be applied, wherein the security countermeasures are operable to interfere with an ability of malware to interact with served electronic resources to which the security countermeasures have been applied when the served electronic resources are executed on the computing devices, and
(ii) select, based on the identified security policies, respective sets of security countermeasures that are to be applied to the electronic resources that are to be served in response to the requests, including from among one or more first choices that result in applying no security countermeasures and one or more second choices that result in applying various versions of one or more particular security countermeasures to the electronic resources;
a re-coding engine on the one or more computers to re-code the electronic resources requested by the computing devices using the one or more particular security countermeasures selected by the security policy manager when the security policy manager has chosen to apply the one or more particular security countermeasures; and
a network interface on the one or more computers to serve the re-coded electronic resources to the computing devices.

17. The computer system of claim 16, further comprising a token recipe manager stored in the one or more memories in the one or more computers to generate shared secret recipes for the computing devices that are usable by the computing devices to generate the security tokens based on one or more internet protocol (IP), transmission control protocol (TCP), and hypertext transfer protocol (HTTP) header values associated with the requests from the computing devices.

18. The computer system of claim 17, wherein the security policy manager is further programmed to use the shared secret recipes and the one or more IP, TCP, and HTTP header values to determine whether the security tokens are valid.

19. One or more computer-readable devices having instructions stored thereon that, when executed by one or more processors, cause performance of operations for determining a manner in which to re-code an electronic resource, the operations comprising:
receiving a request from a computing device for the electronic resource;
identifying a security token received from the computing device along with the request;
identifying, based on a value of the security token that identifies a particular entity that submitted the request, a security policy assigned to the particular entity that submitted the request;
selecting, based on the identified security policy assigned to the particular entity that submitted the request, a set of security countermeasures to apply to the electronic resource to be served in response to the request, the security countermeasures operating to interfere with an ability of malware to interact with the served electronic resource when the served electronic resource is on the computing device, wherein selecting the set of security countermeasures comprises selecting from among multiple different choices that include a first choice to apply no security countermeasures and a second choice to apply one or more particular security countermeasures;
in response to selecting the second choice to apply the one or more particular security countermeasures, re-coding first portions of the electronic resource that are to be executed on the computing device using the one or more particular security countermeasures; and serving a re-coded electronic resource having the re-coded first portions and other portions to the computing device in satisfaction of the request.

20. The one or more computer-readable devices of claim 19, wherein:
the one or more particular security countermeasures are configured to obfuscate code for the first portions of the electronic resource in a manner that does not substantially affect a presentation of the electronic resource when the re-coded electronic resource is executed on the computing device.

21. The one or more computer-readable devices of claim 19, wherein the operations further comprise, in response to receiving a second request for an electronic resource that does not include a security token, to select one or more default security countermeasures to apply to the electronic resource to be served in response to the second request, and to use the one or more default security countermeasures to re-code the electronic resource requested in the second request.

22. The one or more computer-readable devices of claim 19, wherein
the security token is generated by the computing device based on a shared secret recipe available to the computing device and the one or more processors.

23. The one or more computer-readable devices of claim 22, wherein the security token is generated by the computing device using information, specified in the shared secret recipe, from one or more internet protocol (IP), transmission control protocol (TCP), and hypertext transfer protocol (HTTP) header values that are associated with the request from the computing device.

* * * * *